United States Patent
Tobari et al.

(10) Patent No.: US 7,426,086 B2
(45) Date of Patent: Sep. 16, 2008

(54) OFF TRACK WRITE PROTECTION FOR DATA STORAGE DEVICE

(75) Inventors: Atsushi Tobari, Kanagawa (JP); Masahide Yamasaki, Kanagawa (JP); Masaomi Ikeda, Kanagawa (JP); Junzou Noda, Kanagawa (JP)

(73) Assignee: Hitachi Global Storage Technologies, Amsterdam (NL)

( * ) Notice: Subject to any disclaimer, the term of this patent is extended or adjusted under 35 U.S.C. 154(b) by 36 days.

(21) Appl. No.: 11/509,117

(22) Filed: Aug. 23, 2006

(65) Prior Publication Data

US 2007/0047134 A1  Mar. 1, 2007

(30) Foreign Application Priority Data

Aug. 24, 2005  (JP) .............................. 2005-243056

(51) Int. Cl.
*G11B 5/09* (2006.01)
*G11B 27/36* (2006.01)

(52) U.S. Cl. .......................................... 360/53; 360/31
(58) Field of Classification Search ........................ None
See application file for complete search history.

(56) References Cited

U.S. PATENT DOCUMENTS

| | | | |
|---|---|---|---|
| 6,046,870 A * | 4/2000 | Karube | 360/31 |
| 6,327,112 B1 * | 12/2001 | Ide et al. | 360/78.04 |
| 6,643,084 B1 * | 11/2003 | Andrew et al. | 360/53 |
| 6,747,833 B2 | 6/2004 | Shimokoshi et al. | |
| 2006/0203376 A1 * | 9/2006 | Yoshioka et al. | 360/75 |

FOREIGN PATENT DOCUMENTS

JP  2003-338146  11/2003

* cited by examiner

*Primary Examiner*—Jason C Olson
(74) *Attorney, Agent, or Firm*—Townsend and Townsend and Crwe LLP; Rambod Nader (57) ABSTRACT

Embodiments of the invention prevent offtrack write that will be caused due to a head vibration in a storage device. In one embodiment, a hard disk drive (HDD) judges approval/disapproval of write of user data to a magnetic disk by using a read signal for user data in addition to servo data in write processing. Thus, a head vibration which cannot be precisely detected based on servo data is detected to prevent off-track write. More specifically, the HDD acquires a read back signal amplitude of a read element with respect to a user data sector within adjacent servo data during a write access phase, and detects a vibration from a maximum value MAX and a minimum value MIN of the read back signal amplitude to judge data write approval/disapproval.

18 Claims, 8 Drawing Sheets

Fig. 8

OFF TRACK WRITE PROTECTION FOR DATA STORAGE DEVICE

CROSS-REFERENCES TO RELATED APPLICATIONS

This application claims priority from Japanese Patent Application No. JP2005-243056, filed Aug. 24, 2005, the entire disclosure of which is incorporated herein by reference.

BACKGROUND OF THE INVENTION

The present invention relates to a data storage device and a method of controlling write of user data thereof, and more particularly to judgment about approval or disapproval of write of user data to a medium.

Devices using various types of media such as optical disks, magnetic tapes and semiconductor circuits are known as data storage devices. Among them, hard disk drives (HDDs) have become popular as storage devices for computers to such an extent that they are one type of the storage devices indispensable for today's computers. Further, not limited to computers, their application is widening more and more due to the superior characteristics with the advent of moving picture recording/reproducing devices, car navigation systems, mobile phones, and removable memories used in digital cameras and the like.

A magnetic disk used in the HDD using a servo sector system has a plurality of data tracks which are concentrically formed. A plurality of servo data having address information, and a plurality of data sectors containing user data are recorded in each data track. A plurality of data sectors are recorded between the servo data. A head element supported by a swinging actuator accesses a desired data sector in accordance with the address information of the servo data, whereby data can be written to the data sector and the data can be read out from the data sector.

When in the HDD using the sector servo system as described above, a target data track is sought to access the target data sector, mechanical vibration remains in the actuator in some cases. This vibration is mainly caused by mechanical resonance of the actuator. When a frequency of this residual vibration takes a value near a sampling frequency, the HDD cannot detect this vibration and positional shift of the head element accompanied by this vibration by using a servo signal. If data is written to a magnetic disk in a state in which the actuator and the head element vibrate, a probability is high in which off-track write is present.

Then, for example, Patent Document 1 (Japanese Patent Laid-open No. 2003-338146) discloses a technique in which in the case where a signal in an off-track detection area which exists not in a servo area but in a data area is read and a level of a regenerative output of the signal concerned drops to a level equal to or lower than a threshold when data is recorded in the data area, it is judged that off-track has been generated, and thus the data recording is stopped. In the technique disclosed in Patent Document 1, when the data is written to the magnetic disk device, off-track detection signal previously recorded in an off-track detection area existing between the servo area and the servo area is read out with a read head, and it is determined whether or not the output level of the off-track detection signal exceeds a threshold in order to judge the presence or absence of the off-track.

BRIEF SUMMARY OF THE INVENTION

In the technique of Patent Document 1, in order to detect a position with a period shorter than a servo sampling period, a pattern (signal) for the detection of off-track stored in the off-track area provided between the data sectors is used. Thus, a different additional servo signal is newly required in addition to the normal sector servo signal and user data sector. Hence, the number of processing in a servo write process increases, and a new processing mechanism for controlling the head position is required.

The present invention has been made with the circumstances as described above as the background, and it is therefore a feature of the present invention to prevent off-track write that will be caused due to mechanical vibration of a head by utilizing an effective technique.

According to a first aspect of the present invention, there is provided a method of controlling write of user data to a medium having a plurality of servo data disposed circumferentially at intervals in each track, and data sectors located between the servo data, comprising: positioning a head above a target track in which the user data is to be written on the rotating medium by using read-out servo data; reading the data sectors of the target track with the head; and determining approval or disapproval of write of data to the medium by using a read signal for the data sector. The approval or disapproval of write of data to the medium is determined by using the read signal for the data sector, whereby a vibration which cannot be precisely detected based on the servo data can be detected, and thus the off-track write that will be caused due to the vibration can be prevented.

According to a second aspect of the present invention, in the first aspect, a fluctuation of a read signal for a data sector within a servo sector is detected, and the approval or disapproval of write of data to the medium is determined by using the fluctuation. As a result, the head vibration caused between the adjacent servo data can be effectively detected, and thus the off-track write that will be caused due to the head vibration can be prevented.

According to a third aspect of the present invention, in the second aspect, fluctuations of read signals for data sectors within a plurality of servo sectors are detected, and the approval or disapproval of write of data to the medium is determined by using the respective fluctuations of the read signals of the plurality of servo sectors. As a result, the judgment for the approval or disapproval can be more precisely performed.

According to a fourth aspect of the present invention, in the second aspect, the approval or disapproval of write of data to the medium is determined by using a fluctuation of the read signal for the data sector in a single servo sector. As a result, the judgment for the approval or disapproval based on the efficient processing can be performed.

According to a fifth aspect of the present invention, in the third aspect, the approval or disapproval of write of data to the medium is determined by using a maximum value and a minimum value of the read signal for the data sectors in the servo sector. As a result, the vibration can be precisely and readily detected.

According to a sixth aspect of the present invention, in the third aspect, the plurality of servo sectors are continuous servo sectors. As a result, the judgment for the approval or disapproval can be more precisely performed.

According to a seventh aspect of the present invention, in the first aspect, the approval or disapproval of write of data to the medium is determined by using a head position identified by the servo data, and a read signal for the data sector in the same servo sector as that of the servo data. As a result, the precise judgment for the approval or disapproval can be performed with less data.

According to an eighth aspect of the present invention, in the first aspect, the approval or disapproval of write of data to the medium is determined by using a head position and a head speed identified by the servo data, and a read signal for the data sector in the same servo sector as that of the servo data. As a result, the precise judgment for the approval or disapproval can be performed with less data.

According to a ninth aspect of the present invention, there is provided a data storage device for writing user data to a medium having a plurality of servo data disposed circumferentially at intervals in each track, and data sectors located between the servo data, comprising: a head for reading out the servo data and the data sectors from the medium; and a controller for controlling positioning of the head above a target track in which the user data is to be written on the rotating medium by using the read-out servo data, and for determining approval or disapproval of write of the user data to the medium by using a read signal for the data sector in the target track. The approval or disapproval of write of data to the medium is determined by using the read signal for the data sector, whereby a vibration which cannot be precisely detected based on the servo data can be detected, and thus the off-track write that will be caused due to the vibration can be prevented.

According to a tenth aspect of the present invention, in the ninth aspect, the controller determines the approval or disapproval of write of the user data to the medium by using a fluctuation of a read signal for a data sector within a servo sector. As a result, the head vibration caused between the adjacent servo data can be effectively detected, and thus the off-track write that will be caused due to the head vibration can be prevented.

According to an eleventh aspect of the present invention, in the tenth aspect, the controller determines the approval or disapproval of write of the user data to the medium by using fluctuations of read signals within the plurality of servo sectors. As a result, the judgment for the approval or disapproval can be more precisely performed.

According to a twelfth aspect of the present invention, in the tenth aspect, the controller determines the approval or disapproval of write of the user data to the medium by using the fluctuation of the read signal for the data sector in a single servo sector. As a result, the judgment for the approval or disapproval based on the efficient processing can be performed.

According to a thirteenth aspect of the present invention, in the ninth aspect, the controller determines the approval or disapproval of write of the user data to the medium by using a maximum value and a minimum value of the read signal for the data sector in the servo sector. As a result, the vibration can be precisely and readily detected.

According to a fourteenth aspect of the present invention, in the eleventh aspect, the plurality of servo sectors are continuous servo sectors. As a result, the judgment for the approval or disapproval can be more precisely performed.

According to a fifteenth aspect of the present invention, in the ninth aspect, the controller determines the approval or disapproval of write of the user data to the medium by using a head position identified by the servo data, and a read signal for the data sector in the same servo sector as that of the servo data. As a result, the precise judgment for the approval or disapproval can be performed with less data.

According to a sixteenth aspect of the present invention, in the ninth aspect, the controller determines the approval or disapproval of write of the user data to the medium by using a head speed identified by the servo data, and a read signal for the data sector in the same servo sector as that of the servo data that specifies the head speed. As a result, the precise judgment for the approval or disapproval can be performed with less data.

According to a seventeenth aspect of the present invention, in the ninth aspect, the controller determines the approval or disapproval of write of the user data to the medium by using head positions and head speeds associated with the plurality of servo data, and read signals for the data sectors in the respective servo sectors of the plurality of servo data. As a result, the precise judgment for the approval or disapproval can be performed with less data.

According to the present invention, it is possible to prevent the off-track write that will be caused due to the head vibration.

DETAILED DESCRIPTION OF THE INVENTION

Hereinafter, an embodiment to which the present invention can be applied will be described. For the sake of clarification of description, omission and simplification are suitably made in the following description and drawings. In addition, in the drawings, the same constituent elements are designated with the same reference numerals, and for the sake of clarification of description, repeated description is omitted if necessary.

One of the characteristic points in write processing control of the present embodiment is judgment for approval or disapproval of write of user data to a magnetic disk. In particular, in write processing, the approval or disapproval of write of the user data to the magnetic disk 11 is judged by using a read signal for the user data in addition to servo data. As a result, an actuator vibration which cannot be precisely detected based on the servo data is detected to prevent off-track write. Hereinafter, the embodiment of the present invention will be described by exemplifying a hard disk drive (HDD) as an example of a data storage device.

Figure 1:
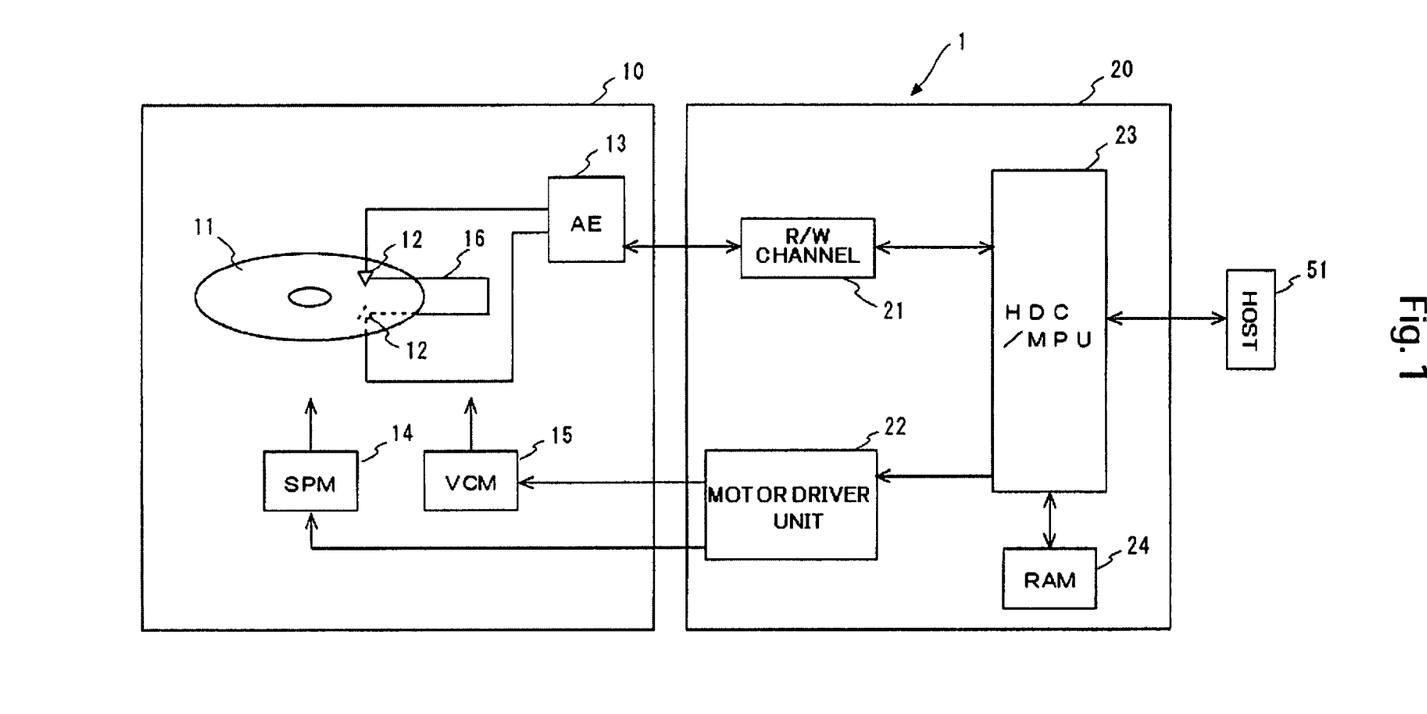
FIG. 1 is a block diagram schematically showing an overall configuration of an HDD according to an embodiment of the present invention.

To make understanding of the characteristic points of this embodiment easy, firstly, an outline of an overall configuration of the HDD will be described. FIG. 1 is a block diagram schematically showing an HDD 1 according to this embodiment. As shown in FIG. 1, the HDD 1 includes a magnetic disk 11 as an example of a medium (recording medium), head elements 12 as an example of a head, arm electronics (AE) 13, a spindle motor (SPM) 14, a voice coil motor (VCM) 15, and an actuator 16, which are provided in a hermetically sealed enclosure 10.

The HDD 1 is provided with a circuit board 20 which is fixed to the outside of the enclosure 10. The HDD 1 has on the circuit board 20 ICs such as a read write channel (R/W channel) 21, a motor driver unit 22, and an integrated circuit of a hard disk controller (HDC) and an MPU (hereinafter referred to as an HDC/MPU) 23, and a RAM 24. Incidentally, the individual circuits can be integrated in configuration into one IC or can be separated into a plurality of ICs for mounting.

User data from an external host 51 is received by the HDC/MPU 23 and written to the magnetic disk 11 through the R/W channel 21 and the AE 13 by the head element 12. In addition, the user data stored in the magnetic disk 11 is read out by the head element 12, and outputted to the external host 51 from the HDC/MPU 23 through the AE 13 and the R/W channel 21.

Next, the constituent elements of the HDD 1 will be described. The magnetic disk 11 is fixed to the SPM 14. The SPM 14 rotates the magnetic disk 11 at a predetermined speed. The motor driver unit 22 drives the SPM 14 in accordance with control data from the HDC/MPU 23. The magnetic disk 11 of this example includes recording surfaces on which data is to be recorded on both sides thereof, and the head element 12 is provided in association with each recording surface.

Each of the head elements 12 is fixed to a slider (not shown). In addition, the slider is fixed to an end portion of the actuator 16. The actuator 16 is coupled to the VCM 15 and swings about a pivot shaft, thereby radially moving the head elements 12 (and the sliders) on the rotating magnetic disk 11. The motor driver unit 22 drives the VCM 15 in accordance with the control data (referred to as DACOUT) from the HDC/MPU 23.

The head element 12 includes a write element for converting an electrical signal into a magnetic field in accordance with recording data to be recorded in the magnetic disk 11, and a read element for converting the magnetic field from the magnetic disk 11 into electrical signal. It should be noted that one or more sheets of magnetic disks 11 are provided and the recording surface can be formed on one side or both sides of the magnetic disk 1.

The AE 13 selects one head element 12 for accessing the magnetic disk 11 from among a plurality of head elements 12, amplifies (pre-amplifies) a regenerative signal read out by the head element 12 thus selected with a given gain, and sends the regenerative signal to the R/W channel 21. In addition, the AE 13 sends the recording signal from the R/W channel 21 to the selected head element 12.

When transferring the user data to the host 51, the R/W channel 21 executes read processing. In the read processing, the R/W channel 21 amplifies the read signal supplied from the AE 13 so that the read signal has a given amplitude, extracts data from the acquired read signal, and executes decode processing. The data thus read contains the user data and the servo data. The read user data subjected to the decode processing is supplied to the HDC/MPU 23.

In addition, the R/W channel 21 executes write processing for the user data transferred thereto from the host 51. The R/W channel 21 executes the write processing in accordance with a control signal from the HDC/MPU 23. In the write processing, the R/W channel 21 code-modulates the write data supplied from the HDC/MPU 23, converts the write data thus code-modulated into a write signal, and supplies the resulting write signal to the AE 13.

In the HDC/MPU 23, the MPU operates in accordance with a code loaded into the RAM 24. With the activation of the HDD 1, in addition to the code for permitting the MPU to operate, data required for the control and data processing is loaded from the magnetic disk 11 or the ROM (not shown) into the RAM 24. The HDC/MPU 23 executes overall control for the HDD 1 in addition to processing required for data processing such as read/write processing control, management of the order of command execution, positioning control (servo control) for the head elements 12 by using a servo signal, interface control, and defect management.

One of the points to be noticed in this embodiment is a technique for judging approval or disapproval of write of the user data to the magnetic disk 11. In the write processing, the HDC/MPU 23 of this embodiment judges the approval or disapproval of write of the user data to the magnetic disk 11 by using a read signal for the user data in addition to the servo data. With the above technique, an actuator vibration which is nearly synchronized with the servo sampling is detected in order to prevent off-track write. The vibration detecting technique and the write approval/disapproval judging processing will be described in detail later.

Figure 2:
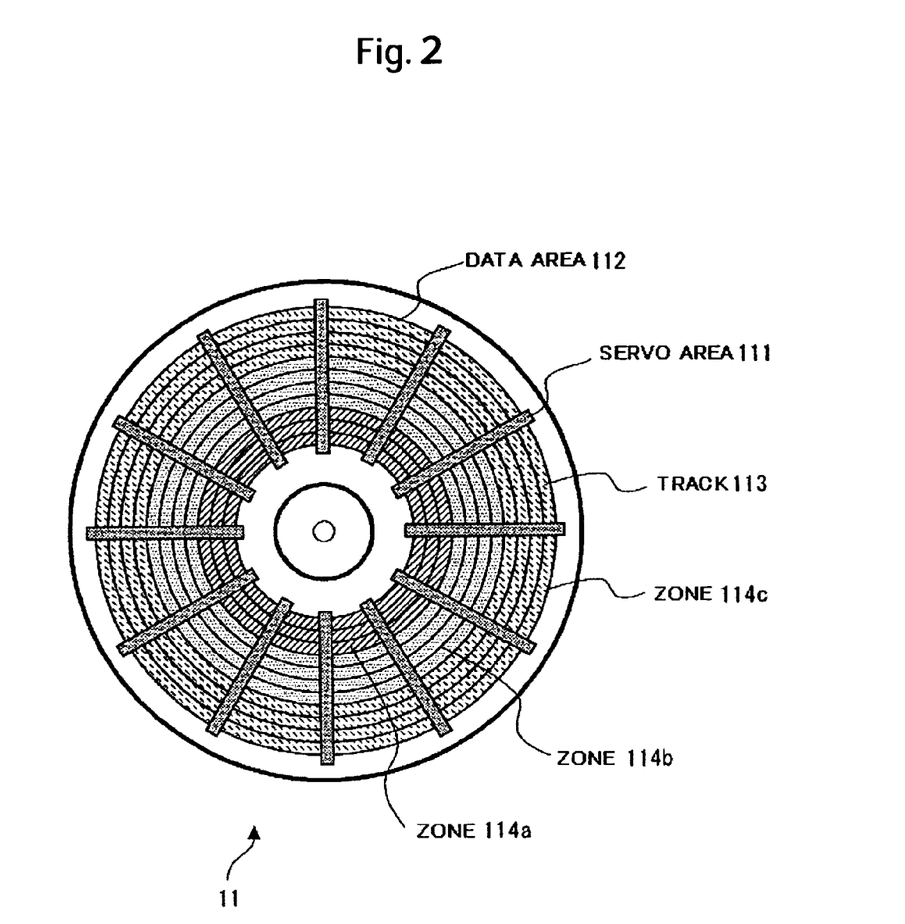
FIG. 2 is a diagram schematically showing a physical format of data recorded on a magnetic disk according to this embodiment.

Referring to FIG. 2, recorded data on the magnetic disk 11 will be described. FIG. 2 schematically shows a state of the recorded data on a recording surface of the magnetic disk 11. As shown in FIG. 2, a plurality of servo areas 111 and data areas 112 are formed on the recording surface of the magnetic disk 11. The plurality of servo areas 111 extend radially in a radial direction from a center of the magnetic disk 11 and are formed separately from each other at intervals of a predetermined angle. The data areas 112 are formed between the corresponding adjacent servo areas 111. The servo areas 111 and the data areas 112 are alternately provided at intervals of a predetermined angle. The servo data used to perform the positioning control for the head elements 12 is recorded in each of the servo areas 111. The user data is recorded in each of the data areas 112.

A plurality of tracks 113 each of which has a predetermined width in the radial direction and which are concentrically formed are formed on the recording surface of the magnetic disk 11. The servo data and the user data are recorded along the tracks 113. One track 113 includes a plurality of data sectors (recording units of the user data) each of which is provided between the corresponding servo areas 111. That is to say, each of the tracks 113 contains a plurality of servo data which are disposed separately from one another at intervals of the predetermined angle, and a plurality of data sectors each of which is disposed between the corresponding servo data. In addition, in this specification, a sector extending from one servo data to a data sector right before the next servo data in one track is referred to as one servo sector.

A plurality of tracks 113 are grouped into a plurality of zones 114 according to radial positions of the magnetic disk 11. The number of data sectors contained in one track 113 is set in each of the zones. In FIG. 2, three zones 114a to 114c are exemplified. A recording frequency is changed for every zone, whereby it is possible to increase a recording density of the overall magnetic disk 11.

Hereinafter, a technique for controlling user data write to the magnetic disk 11 will be described. The HDD 1 of this embodiment performs write processing control by using an amplitude of the read signal for the data sector (user data) in addition to the servo data. The read signal for the data sector is used to detect the actuator vibration synchronized with servo sampling. When there is the vibration exceeding a reference, Write Inhibit is set. As a result, the head vibration can be detected which cannot be detected based on a servo signal, and off-track write due to the head vibration can be prevented.

FIG. 3(a) schematically shows a situation in which the read element 121 included in the head element 12 makes track following. There is shown a situation of movement of the read element 121 between two pieces of servo data 211a and 211b. Seven data sectors 212a to 212g are recorded between the two pieces of servo data 211a and 211b. That is to say, in this track, one servo sector is constituted by the servo data 211a, and the seven servo data sectors 212a to 212g.

Figure 3:
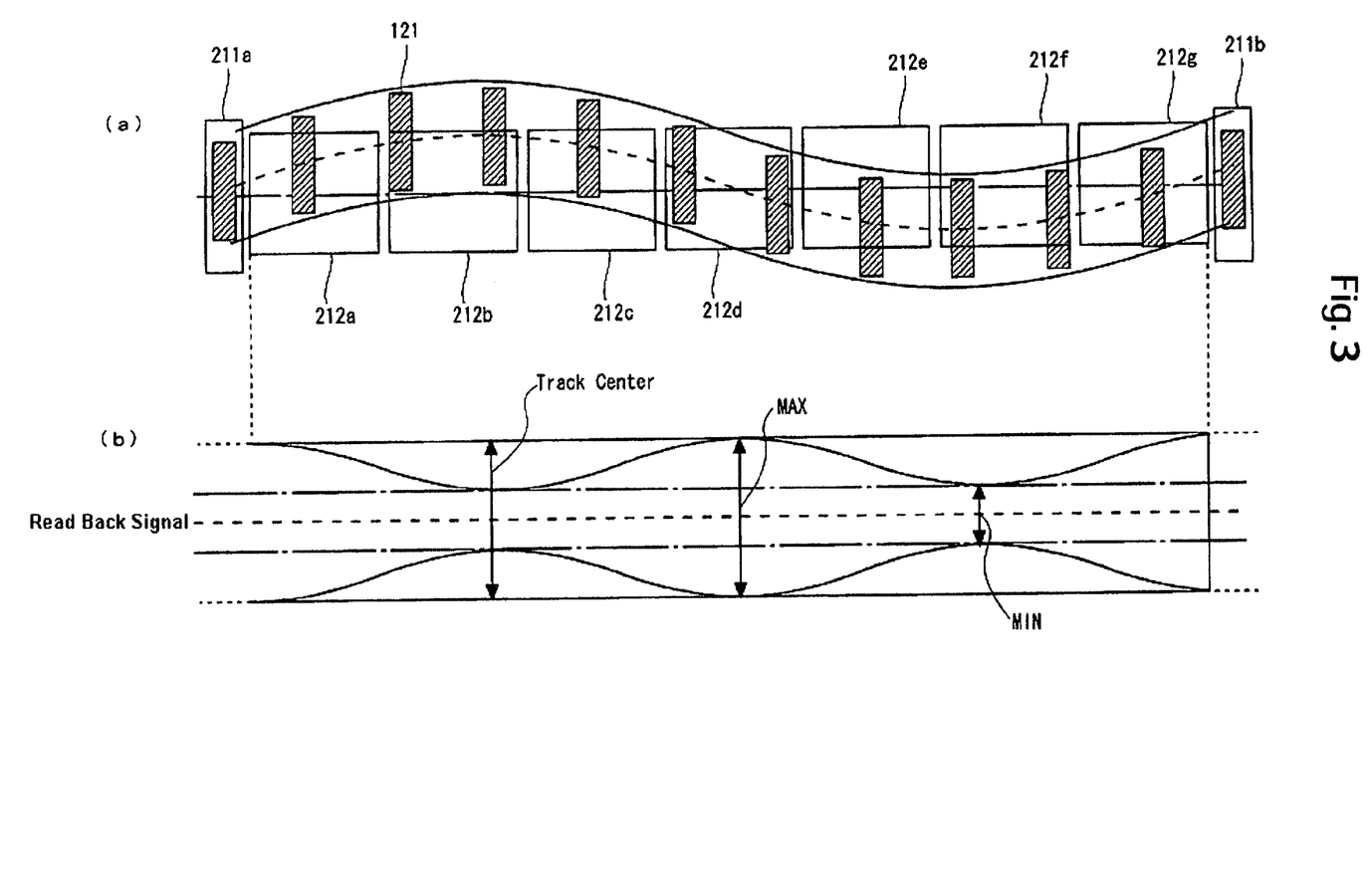
FIG. 3 is a diagram showing a situation in which a read element according to this embodiment makes track following, and a read back signal change accompanied by the track following.

When the read element 121 radially vibrates at the same frequency as the servo sampling frequency or at a frequency which is integral multiples of the servo sampling frequency as shown in FIG. 3, the HDD 1 can detect the vibration based on the servo signal since the servo signal read out by the read element 121 does not change. When the user data is started to be written to the magnetic disk 11 in this state, the off-track write takes place, and thus new different user data is overwritten to the user data of the adjacent track.

On the other hand, the amplitude of the read signal for the data sector 212 changes in accordance with the vibration caused in one servo sector. One of the values representing the amplitude of the reading signal for the data sector is read back signal amplitude. The read back signal amplitude is a value representing the actual signal amplitude when the read element 121 reads out a pattern within the data sector. That is to say, as shown in FIG. 3(b), the read back signal amplitude changes such that it monotonously decreases in a radial distance from a following track center of the read element 121.

Thus, the read back signal amplitude is used to detect the vibration (head vibration) of the actuator 16, i.e., the head element 12. When the actuator is beyond the limits of a reference, the data write to the magnetic disk 11 is inhibited. In this way, write is permitted under a condition in which the head vibration falls within the limits of the reference, whereby it is possible to effectively prevent the off-track write from being generated. In addition, since the head vibration results from the mechanical resonance of the actuator, it decreases with time. Hence, when the head vibration exceeds the reference, the HDD 1 does not start to write the user data to the magnetic disk 11 until the vibration of the actuator becomes small.

The HDD 1 of this embodiment uses a fluctuation of the read back signal amplitude in order to precisely detect the vibrations of the head elements 12. Since a factor to be detected is the mechanical head vibration between the servo data, the fluctuation of the read back signal amplitude in this area becomes a-problem. When the fluctuation remarkably exceeds a reference value, write is inhibited, while when the fluctuation falls within the reference, write is permitted.

Preferably, as shown in FIG. 3(b), the magnitude of the fluctuation of the read back signal amplitude is judged by using a difference between a maximum value (MAX) and a minimum value (MIN) of a read back signal envelope between the servo sectors 211a and 211b. For example, the approval or disapproval of write can be determined by comparing Δ=(MAX−MIN) with a previously set value. In addition thereto, a calculated value such as MAX/MIN or (MAX−MIN)/MIN can be used in order to determine approval or disapproval of write. Incidentally, to avoid the influence of noises, for example, the maximum value (MAX) of the amplitude may also be determined from among the amplitudes except for the amplitudes beyond the limits of the specified amplitude.

The HDD 1 can determine the approval or disapproval of write by using the fluctuation of the read back signal amplitude in one or a plurality of servo sectors. For example, the fluctuation of the read back signal amplitude in the servo sector right before the servo sector to which the user data is written is detected, and the approval or disapproval of write can be determined based on the magnitude of the detected fluctuation. It is preferable in terms of processing efficiency or performance that the approval or disapproval of write is judged based on the fluctuation of the read back signal amplitude in the single servo sector.

Alternatively, if the HDD 1 detects the fluctuations of the read back signal amplitudes in a plurality of servo sectors and the magnitude of each fluctuation detected falls within the limits of the reference, the HDD 1 can permit data write to the magnetic disk 11. For more precise vibration detection, it is preferable to use the fluctuations of the read back signal amplitudes in a plurality of servo sectors. In addition, it is preferable that the plurality of servo sectors be continuous.

As such, a change in read signal amplitude in the data sector, for example, can also be obtained from a variable gain amplifier (VGA) gain included in the R/W channel 12. The VGA performs gain adjustment so that the amplitude of a preamble as a given frequency signal within the data sector becomes constant. The HDD 1 can determine the data sector read signal amplitude associated with the data sectors from the gain. The HDD 1 allows the VGA gain to detect the read back signal amplitudes in the data sectors 212a to 212g between the servo sectors 211a and 211b to judge the magnitude of the amplitude fluctuation from the maximum value (MAX) and the minimum value (MIN) among them.

Figure 4:
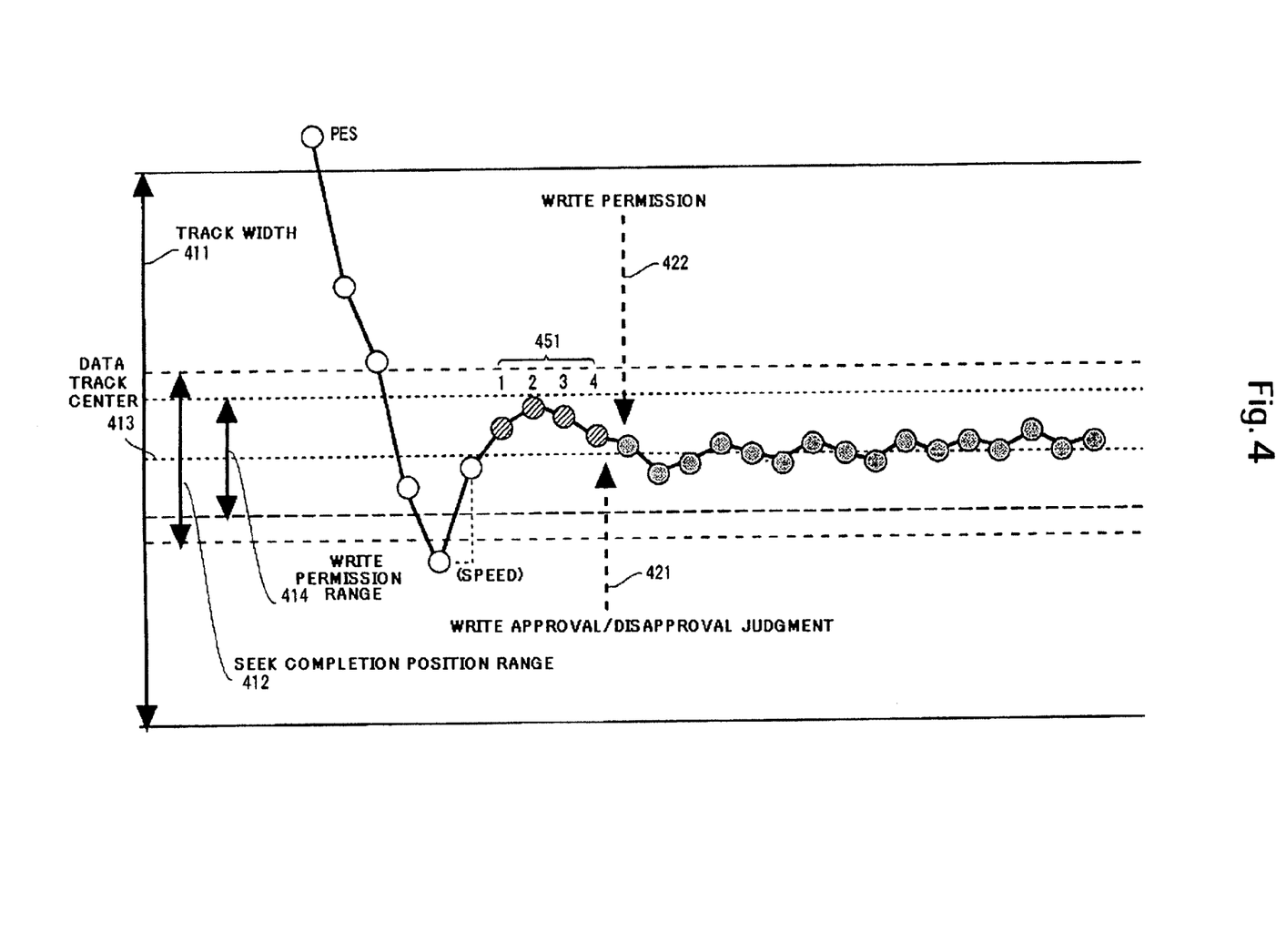
FIG. 4 is a diagram showing a change in servo signal accompanied by movement of a head element in write processing according to this embodiment.

Subsequently, an overall flow of write processing of this embodiment will be described. FIG. 4 shows a change in the servo signal accompanied by the movement of the head element 12 in the write processing. Each circle represents a head position, and the head position changes from a left-hand side to a right-hand side in the figure. The head position can be represented by a value of a position signal (PES: Position Error Signal) read out by the head element 12 (the read element 121). The position signal is determined based on address data and a burst of the servo signal.

In the write processing, the head element 12 performs an operation for seek from a current track to a target track. The head element 12 is moved within a track width 411 of the target track and then enters a seek completion range 412. Thereafter, the head element 12 proceeds by following along the track center 413 of the data track. The HDD 1 of this embodiment permits user data write to the magnetic disk 11 when the head position determined based on the position signal, the head speed determined similarly based on the position signal, and the mechanical vibration detected from the read back signal amplitude fulfill their respective conditions.

More specifically, a first condition is such that the head speed obtained from a change in position signal falls within the limits of a reference value. Moreover, it is a second condition that the value of the position signal falls within a write permission range 414 as a reference range. A plurality of continuous servo signals need to fulfill these two conditions. FIG. 4 shows an example in which four continuous signals 451 need to fulfill the above-mentioned two conditions.

In the HDD 1 of this example, it is a condition for write permission that the fluctuation of the read back signal amplitude in the data sector falls within the reference range. In the example of FIG. 4, the HDD 1 performs the judgment about the head vibration at timing 421 after the four servo signals 451 have fulfilled the established conditions about the head position and the head speed. When the fluctuation of the read back signal amplitude falls within the reference range, write is permitted in the forward servo sectors in and after the next servo sector 422.

Figure 5:
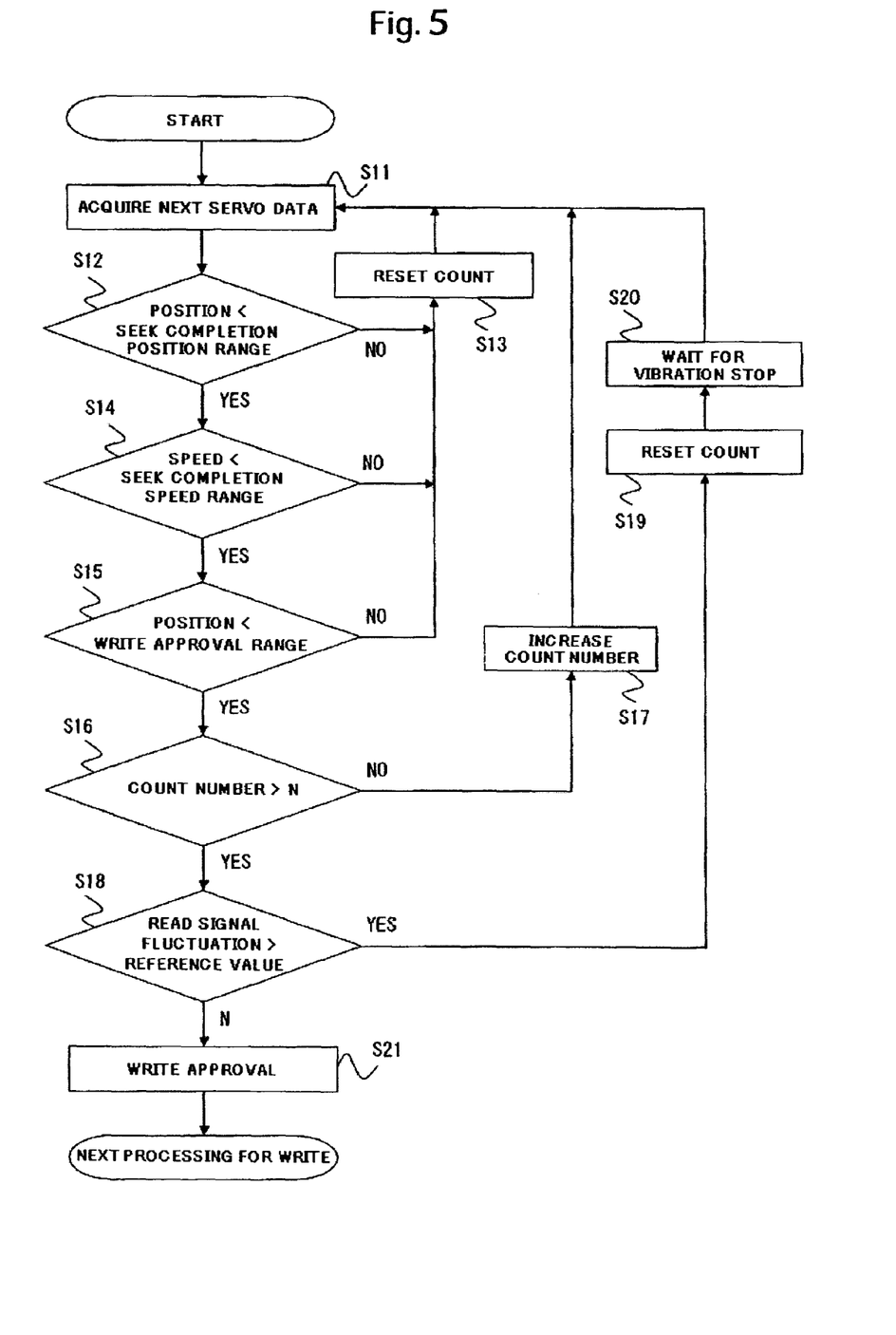
FIG. 5 is a flow chart concretely showing write approval/disapproval judging processing according to this embodiment.

The above-mentioned write approval/disapproval judging processing will now be described in detail with reference to the flow chart of FIG. 5 and the diagram of FIG. 4. The HDD/MPU 23 executes the write approval/disapproval judging processing by using the data obtained from the R/W channel 21. When the write processing is started, the HDC/MPU 23 acquires pieces of servo data in accordance with the movement of the head element 12 (S11). More specifically, the R/W channel 21 extracts the servo data from the servo signal read out by the head element 12 and transfers the servo data thus extracted to the HDC/MPU 23.

Next, the HDC/MPU 23 judges whether or not each of the head positions (each of the position signals) falls within the seek completion range 412 (S12). When each of the head positions does not fall within the seek completion range 412, the counter is reset (S13) and the operation returns back to the step (S11) of acquiring the next servo data. The counter, as shown in FIG. 4, is used to judge whether or not a plurality of pieces of continuous servo data 451 fulfill the specified conditions. When each of the head positions falls within the seek completion range 412, the HDC/MPU 23 judges whether or not the head speed falls within the seek completion range as the reference range (S14).

When the head speed does not fall within the seek completion range, the counter is reset (S13), and the operation returns back to the step (S11) of acquiring the next servo data. When the head speed falls within the seek completion range, it is judged whether or not each of the head positions (each of the position signals) falls within the write permission range 414 (S15). When each of the head positions (each of the position signals) does not fall within the write permission range 414, the counter is reset (S13), and the operation returns back to the step (S11) of acquiring the next servo data. When each of the head positions (each of the position signals) falls within the write permission range 414, the HDC/MPU 23 judges whether or not a count number exceeds a reference value N (3 in the example of FIG. 4) (S16). When the count number does not exceed N, the HDC/MPU 23 increments the count number (S17), and the operation returns to the step (S11) of acquiring the next servo data.

When the count value exceeds the reference value N (S16), the HDC/MPU 23 judges whether or not the fluctuation of the read back signal amplitude falls within the limits of the reference (S18). This judgment can be performed in accordance with the above-mentioned technique, e.g., under a condition for the permission that $\Delta=(MAX-MIN)$ does not exceed the reference value. When the amplitude fluctuation does not fall within the limits of the reference (S18), the HDC/MPU 23 resets the counter (S19), and thereafter waits for the vibration of the head element 12 to stop (S20). More specifically, after stopping processing for the predetermined specified time, the HDC/MPU 23 restarts the processing in and after the step (S11) of acquiring the next servo data. On the other hand, when the amplitude fluctuation of the read back signal falls within the limits of the reference (S18), the HDC/MPU 23 performs the judgment about the write permission (S21), and writes the user data in the target data sector.

In the above-mentioned processing flow, the write approval/disapproval judgment is performed based on the amplitude fluctuation of the single read back signal in one servo sector right after the head position and the head speed fulfill the specified conditions. In another embodiment, the write approval/disapproval judgment can also be performed by using the amplitude fluctuations in a plurality of servo sectors after the head position and the head speed fulfill the specified conditions. For example, the HDC/MPU 23 includes another counter, and permits write when each of the fluctuations of the read back signal amplitudes in a plurality of continuous servo sectors is equal to or smaller than the reference value. As a result, the more precise amplitude judgment is performed, and the off-track write is more reliably prevented. In this case, a plurality of servo sectors for the judgment about the vibration are required in addition to a plurality of servo sectors for the judgment about the head speed and the head position.

Figure 6:
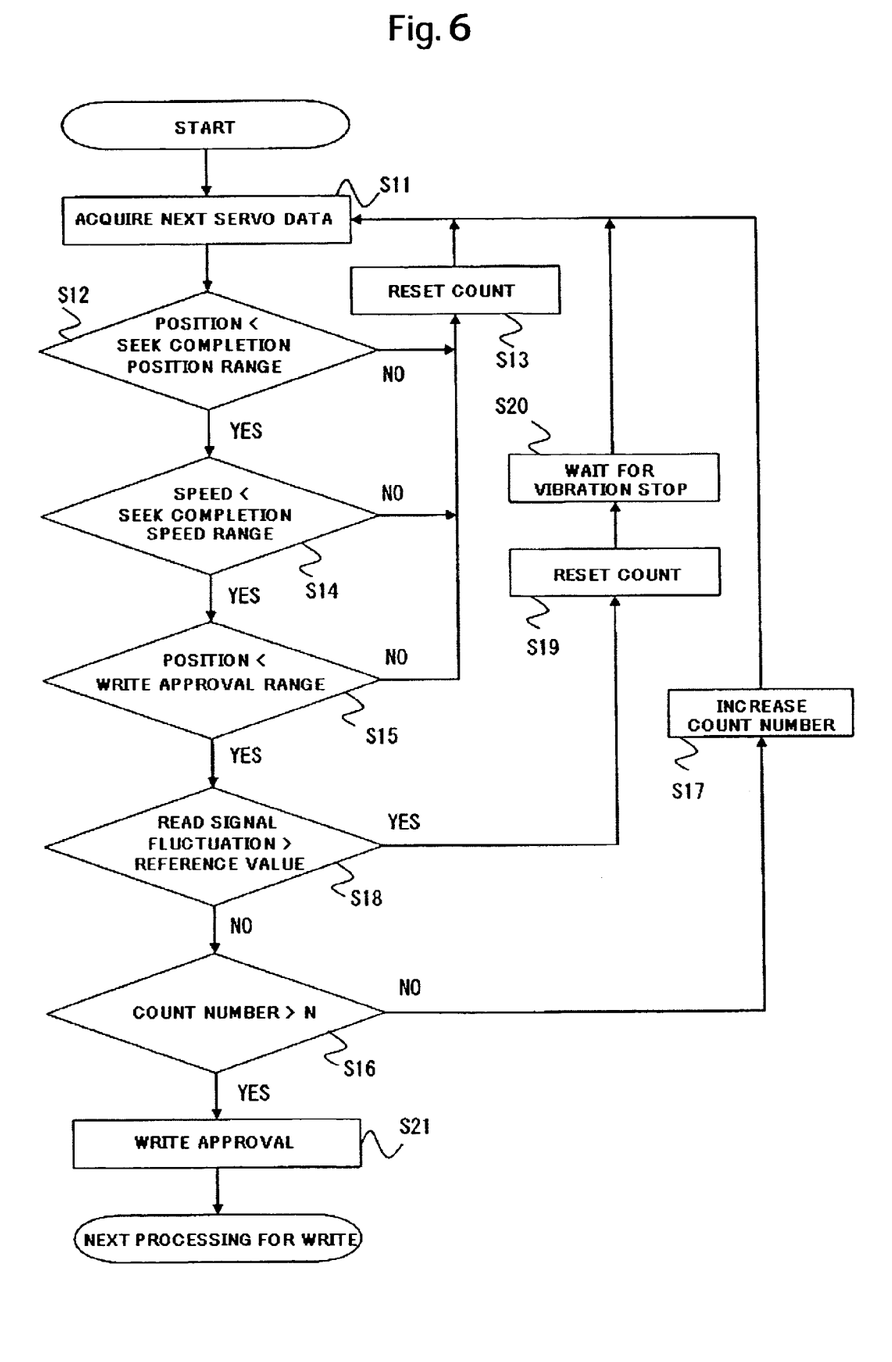
FIG. 6 is a flow chart showing write approval/disapproval judging processing of another aspect in this embodiment.

The flow chart of FIG. 6 shows another preferable write approval/disapproval judging processing flow. In this write approval/disapproval judging processing flow, unlike the example of FIG. 5, the judgment about the head vibration is performed together with the judgment about the head position and the head speed. Thus, the precise judgment about the vibration is performed by using a plurality of servo sectors, and the number of servo sectors for the write approval/disapproval judgment is reduced to enhance the performance. This processing flow is different from the processing flow described above with reference to FIG. 5 in that the vibration judging step (S18) is executed before the step of judging the count number (S16).

That is to say, when the head speed falls within the seek completion range (S14), and the head position falls within the write permission range 414 (S15), the HDC/MPU 23 further acquires the read back signal amplitude of the data sector within the servo sector concerned, and executes judgment processing (S18) about the fluctuation thereof. When the signal amplitude fluctuation falls within the limits of the reference, the HDC/MPU 23 increments the counter (S17). When the read back signal amplitude fluctuation exceeds the reference value, the HDC/MPU 23 resets the counter (S19) and repeatedly executes the processing in and after the step (S11) of acquiring the next servo data after waiting for the stop of the head vibration (S20).

In this way, the head vibration judging processing (S18) using the data sector read signal is executed with respect to the same servo sector as that of the servo signal together with the processing (S13 to S15) for judging the head speed and the head position using that servo signal, whereby the efficient judgment processing can be executed even when the vibration judging processing is executed with respect to a plurality of servo sectors. As a result, the reduction of the performance can be suppressed.

Figure 7:
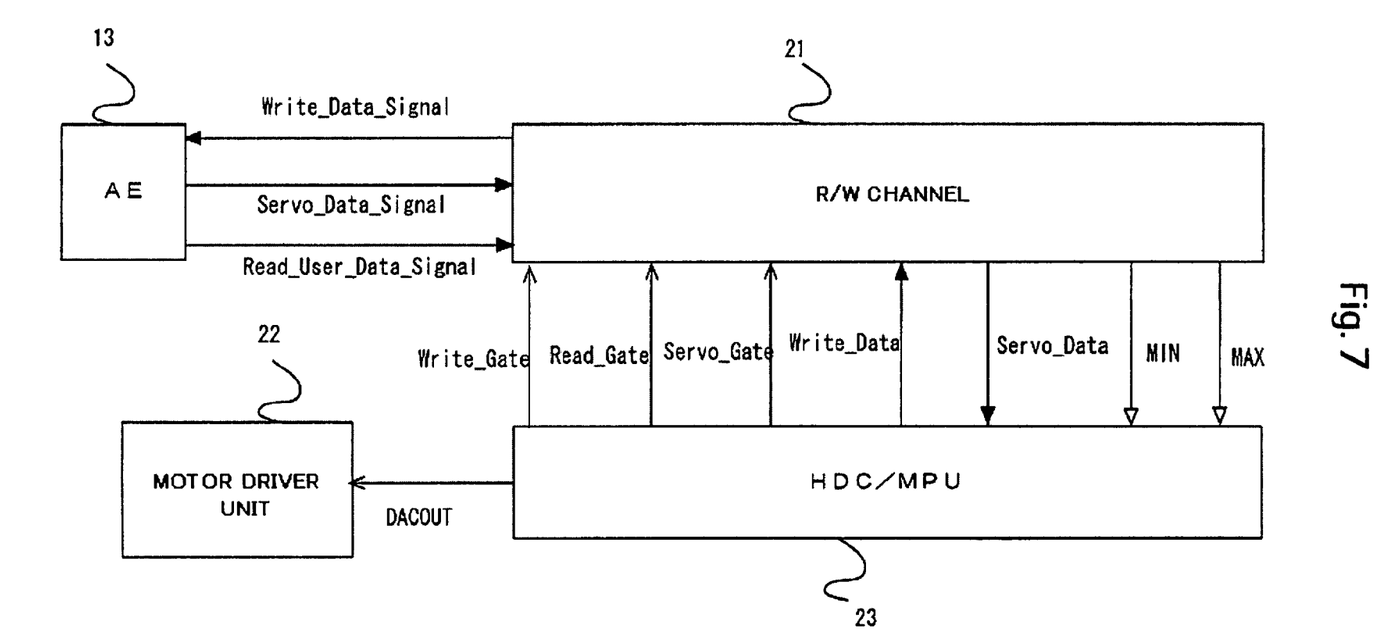
FIG. 7 is a block diagram showing transmission signals transmitted among an HDC/MPU, an R/W channel and an AE.
Figure 8:
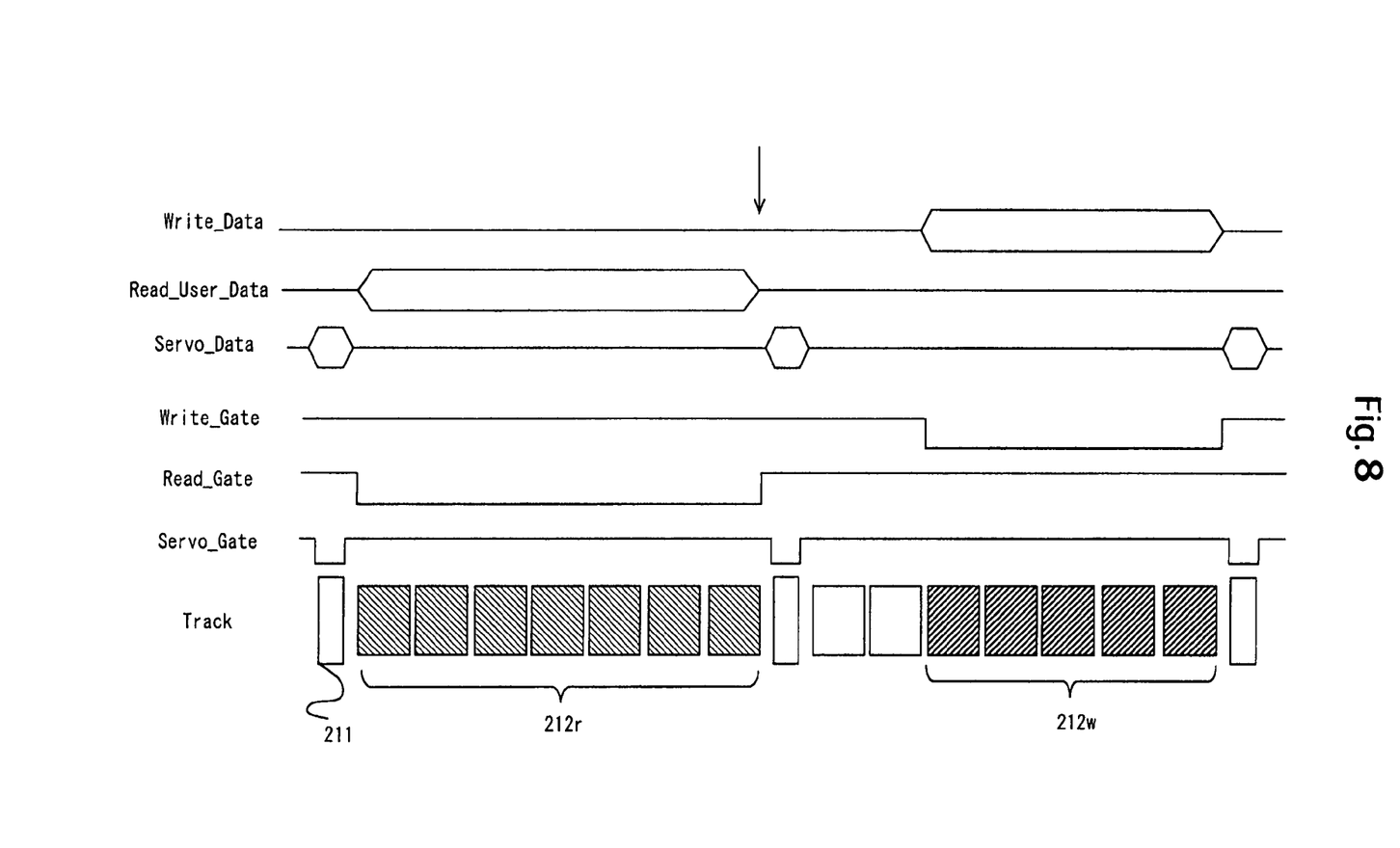
FIG. 8 is a timing chart showing changes in signals shown in FIG. 7 in head vibration detection and write approval/disapproval judging processing according to this embodiment.

Next, signal processing within the HDD 1 in the write approval/disapproval judgment processing will be concretely described in detail. As described above, the HDC/MPU 23 executes the write approval/disapproval judging processing by using the data from the R/W channel 21. FIG. 7 shows transmission signals transmitted among the HDC/MPU 23, the R/W channel 21 and the AE 13. FIG. 8 is a timing chart about these signals. It should be noted that this timing chart schematically shows changes in signals, but does not precisely reflect the timing in the actual HDD. FIGS. 7 and 8 show an example of the head vibration judging processing, and processing for writing the user data in the servo sector next to the servo sector for which write is judged to be permitted.

As shown in FIG. 7, the HDC/MPU 23 outputs control signals, i.e., a write gate signal (Write_Gate), a read gate signal (Read_Gate), and a servo gate signal (Servo_Gate) to the R/W channel 21. The write gate signal (Write_Gate) is a signal used to control write of the user data to the magnetic disk 11. The read gate signal (Read_Gate) is a signal used to control read of the user data from the magnetic disk 11. The servo gate signal (Servo_Gate) is used to control read of the servo data from the magnetic disk 11.

A servo data signal (Servo_Data_Signal) and a read user data signal (Read_User_Data_Signal) amplified by the AE 13 are transferred to the R/W channel 21. The R/W channel 21 generates servo data (Servo_Data) from the servo data signal (Servo_Data_Signal) and transfers the resulting servo data to the HDC/MPU 23. The HDC/MPU 23 generates DACOUT as a VCM (15) control signal from the servo data in order to control the head position, and outputs DACOUT to the motor driver unit 22.

Moreover, the R/W channel 21 identifies a maximum value (MAX) and a minimum value (MIN) of the read back signal amplitude in the corresponding servo sector from the read user data signal (Read_User_Data_Signal) transferred thereto from the AE 13, and stores the maximum value and the minimum value identified in a register (not shown) within the R/W channel 21. The HDC/MPU 23 acquires these values (MAX, MIN) from the register at timing for the head vibration judgment. In write of the data to the magnetic disk 11, the write data (Write_Data) is transferred from the HDC/MPU 23 to the R/W channel 21. The R/W channel 21 then generates a write data signal (Write_Data_Signal) from the transferred write data, and outputs the write data signal to the AE 13.

As shown in FIG. 8, when the servo gate signal (Servo_Gate) is at LOW (Asssert), the servo data (Servo_Data) 211 is read out from the magnetic disk 11. In addition, when the write gate signal (Write_Gate) is at LOW (Asssert), the write data (Write_Data) is written to the magnetic disk 11. Moreover, for the HDD 1 of this embodiment to perform the head vibration judgment, when the head gate signal (Read_Gate) is at LOW (Asssert), the user data (Read_User_Data) 212 is read out from the magnetic disk 11.

In the example of FIG. 8, the HDC/MPU 23 judges the write approval/disapproval by using the maximum value MAX and the minimum value MIN of the read back signal amplitude of a data sector 212r at timing indicated by an arrow. It should be noted that, before this timing, the HDC/MPU 23 has already judged that the head speed and the head position fulfill the specified conditions. In this example, since the head vibration falls within a tolerance, the write data is immediately written to each target data sector 212w in the next servo sector.

While the present invention has been described so far by giving the preferred embodiment as the example, the present invention is not limited to the above-mentioned embodiment. Those skilled in the art can readily change, add, and convert the constituent elements of the above-mentioned embodiment within the scope of the present invention. For example, the write approval/disapproval can also be determined by using the fluctuation of the read back signal between a plurality of servo sectors instead of using the fluctuation of the read back signal within one servo sector. In addition, the present invention is not limited to the HDD, and thus can be applied to the data storage devices using other types of media.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A method of controlling write of user data to a medium having a plurality of servo data disposed circumferentially at intervals in each track, and data sectors located between the servo data, the method comprising:
   positioning a head above a target track in which the user data is to be written on the rotating medium by using read-out servo data;
   reading the data sectors of the target track with said head; and
   determining approval or disapproval of write of data to said medium by using a read signal for the data sector;
   wherein a fluctuation of a read signal for a data sector within a servo sector is detected, and the approval or disapproval of write of data to said medium is determined by using the fluctuation detected.

2. A method according to claim 1, wherein fluctuations of read signals for data sectors within a plurality of servo sectors are detected, and the approval or disapproval of write of data to said medium is determined by using the respective fluctuations of the read signals of the plurality of servo sectors.

3. A method according to claim 2, wherein the plurality of servo sectors are continuous servo sectors.

4. A method according to claim 1, wherein the approval or disapproval of write of data to said medium is determined by using a fluctuation of the read signal for the data sector in a single servo sector.

5. A method according to claim 1, wherein the approval or disapproval of write of data to said medium is determined by using a maximum value and a minimum value of the read signal for the data sectors in said servo sector.

6. A method according to claim 5, wherein the approval or disapproval of write of data to said medium is determined by whether a difference between the maximum value and the minimum value of the read signal for the data sectors in said servo sector exceeds a reference value.

7. A method according to claim 1, wherein the approval or disapproval of write of data to said medium is determined by using a head position identified by the servo data, and a read signal for the data sector in the same servo sector as the servo sector of the servo data.

8. A method according to claim 1, wherein the approval or disapproval of write of data to said medium is determined by using a head position and a head speed identified by the servo data, and a read signal for the data sector in the same servo sector as the servo sector of the servo data.

9. A method according to claim 1, wherein the approval or disapproval of write of data to said medium is determined by using head positions and head speeds associated with the plurality of servo data, and read signals for the data sectors in the respective servo sectors of the plurality of servo data.

10. A data storage device for writing user data to a medium having a plurality of servo data disposed circumferentially at intervals in each track, and data sectors located between the servo data, the data storage device comprising:
    a head for reading out the servo data and the data sectors from said medium; and
    a controller to control positioning of the head above a target track in which the user data is to be written on the rotating medium by using the read-out servo data, and to determine approval or disapproval of write of the user data to said medium by using a read signal for the data sector in the target track;
    wherein said controller determines the approval or disapproval of write of the user data to said medium by using a fluctuation of a read signal for a data sector within a servo sector.

11. A data storage device according to claim 10, wherein said controller determines the approval or disapproval of write of the user data to said medium by using fluctuations of read signals within a plurality of servo sectors.

12. A data storage device according to claim 11, wherein the plurality of servo sectors are continuous servo sectors.

13. A data storage device according to claim 10, wherein said controller determines the approval or disapproval of write of the user data to said medium by using a fluctuation of the read signal for the data sector in a single servo sector.

14. A data storage device according to claim 10, wherein said controller determines the approval or disapproval of write of the user data to said medium by using a maximum value and a minimum value of the read signal for the data sector in the servo sector.

15. A data storage device according to claim 14, wherein the approval or disapproval of write of data to said medium is determined by whether a difference between the maximum value and the minimum value of the read signal for the data sectors in said servo sector exceeds a reference value.

16. A data storage device according to claim 10, wherein said controller determines the approval or disapproval of write of the user data to said medium by using a head position identified by the servo data, and a read signal for the data sector in the same servo sector as the servo sector of the servo data.

17. A data storage device according to claim 10, wherein said controller determines the approval or disapproval of write of the user data to said medium by using a head speed identified by the servo data, and a read signal for the data sector in the same servo sector as the servo sector of the servo data that specifies the head speed.

18. A data storage device according to claim 12, wherein said controller determines the approval or disapproval of write of the user data to said medium by using head positions and head speeds associated with the plurality of servo data, and read signals for the data sectors in the respective servo sectors of the plurality of servo data.

* * * * *